3,346,556
TREATMENT OF MANNO GALACTAN GUMS

Stanley E. Foster, Thomaston, Maine, assignor to Marine Colloids, Inc., Springfield, N.J., a corporation of Delaware
No Drawing. Filed Oct. 14, 1965, Ser. No. 496,177
10 Claims. (Cl. 260—209)

This invention relates to manno galactan gums and relates more especially to the treatment of extracts of said gums so as to better control their stability and so as to afford extracts having desired viscosity-inducing characteristics.

Manno galactan gums are well known commercial products. The manno galactan gums in most widespread commercial use are locust bean gum and guar. However, other manno galactan gums such as tamarind and tara have generally similar properties. They swell readily in cold water and can be dissolved in hot water to produce solutions which are notable for their high viscosity even at high dilution such as 1% or 1.5%.

The manno galactan gums, as produced commercially by the procedures conventionally employed, may possess viscosity-imparting characteristics that are excessively high. Thus locust bean gum and guar as supplied commercially usually result at a concentration of 1%, in a solution having a viscosity of around 1000 to 4000 centipoises at 25° C. using a Brookfield Viscometer Model LVF, spindle No. 2 at 6 r.p.m. (Viscosities mentioned elsewhere herein also are determined with said viscometer, the temperature, spindle and r.p.m. being indicated in connection with the respective viscosity values that are given.) However, for a number of commercial applications it is desirable to be able to furnish a gum that provides a solution having a predetermined viscosity lower than that imparted by the same gum in the form in which it is ordinarily sold commercially. Thus, for various food products wherein a manno galactan gum is used as a thickener or is used in a gel or jelly-type product, it is desirable to employ a gum, a 1% solution of which has a viscosity of around 1000 to 1500 centipoises at 25° C. Solutions having lower viscosities than those produced using the conventional commercial gum also may be desired when the gum is used in paper making, either in the beater or when used as a sizing. This also is the case in connection with applications wherein the gum is used in the sizing or printing of textiles.

When the gum as normally sold commercially is made up into an aqueous solution by dissolving it in hot water, the gum is reasonably stable against hydrolytic degradation. It is well recognized that if a dilute aqueous solution of the gum is acidified and heated, degradation of the gum and concomitant decrease in viscosity-imparting properties may be effected quite rapidly. For example, when such a solution having a viscosity of about 860 centipoises at 55° C. (using spindle No. 2 at 30 r.p.m.) was held at 55° C. and at a pH of 2 for 7½ hours the viscosity at 55° C. dropped from about 860 centipoises to about 160 centipoises. The pH of locust bean gum and the other manno galactan gums in the form ordinarily sold commercially when in aqueous solution usually is in the range from about 4.5 to about 6.8.

Sustained heating beyond that required to get the gum into solution also has a degrading effect that reduces viscosities.

While degradation and lowering of viscosity can be accomplished in the ways mentioned, serious difficulties have been encountered as regards being able to stabilize the gum at a given desired viscosity. One might expect that if the solution were to be neutralized so as to occur at a pH at which it initially had exhibited substantial stability, the stability of the solution would be restored so as to remain at the attained reduced viscosity. However, this is not the case, for once hydrolytic degradation is initiated by acidification or by heat, or both, the gum continues to become more degraded. For example, neutralization of an acid pH will lessen the degradation tendency, but degradation will continue nevertheless. Moreover, the continued degradation takes place irregularly and widely varying viscosity characteristics result from processing that seemingly is closely controlled.

When degradation is induced by acidification or by heating, or both, some insoluble material usually is formed in the solution and when a filtration or other clarifying step is employed continued uncontrolled degradation occurs during the period required for performing the clarification step. A further complicating factor has been observed in that if the filtration is accomplished using filtering equipment wherein the solution comes into contact with iron, the uncontrolled degradation is substantially more pronounced than otherwise would be the case. While the iron with which the solution comes into contact may be essentially insoluble, it appears to be the case that there is sufficient contact with iron to promote by catalysis or otherwise the degradation of the gum. As the result of these and related phenomena the lack of control of stability has presented a baffling problem that has precluded the production of commercial products having predetermined selected viscosity-imparting characteristics on a practical basis.

This invention is predicated upon the discovery that if a manno galactan gum is subjected while in a dilute aqueous solution to conditions under which degradation occur resulting in at least the initiation of degradation, substantially increased resistance to degradation can be afforded by contacting the gum while in dilute aqueous solution with a water soluble organic hydrophilic stabilizing liquid in an amount sufficient to effect substantially increased resistance to degradation and that is insufficient to effect substantial coagulation. Such stabilizing liquids preferably are the lower aliphatic alcohols, namely, aliphatic alcohols containing up to about 8 carbon atoms. The aliphatic alcohols preferably employed are isopropanol and butanol. Methanol and ethanol, because of their greater volatility, are less desirable than isopropanol and butanol and they likewise are somewhat less effective. In addition to the aliphatic alcohols, other alcohols containing hydroxy alkyl radicals may be employed including water soluble hydrophilic polyhydric alcohols such as ethylene glycol, trimethylene glycol, propylene glycol, glycerol and sorbitol. Other freely water soluble organic hydrophilic stabilizing liquids which may be employed are acetone and tetrahydrofuran.

The stabilizing liquids which are employed are water soluble polar organic oxygen-containing hydrophilic liquids. While the invention is not to be regarded as dependent on the correctness of the theoretical reason for their activity, it is believed that the stabilizing liquids tend to counteract the tendency of water molecules to associate into molecular groupings wherein OH groups are tied up, thereby releasing said OH groups with resultant stabilizing effect on the dissolved gum. It appears to be the case that once the inherent stability of the commercial gum has been broken down, the degradation of the gum tends to continue but that the stability of the gum as regards resisting degradation may be increased again by disposing the stabilizing liquid in effective amount in a dilute aqueous solution of the gum that has undergone at least some degradation as the result of its exposure when in dilute aqueous solution to degrading conditions.

The contact of the gum with the stabilizing liquid should occur while the gum is dissolved in a dilute aqueous medium. Thus if the commercial gum in dry powder form is slurried with a volatile alcohol that is effective when contacted with the gum when in dilute aqueous solution, but the alcohol is removed from the solid gum particles by drying them before the gum is caused to be dissolved in making up a gum solution, there is little or no stabilizing effect. However, if, instead of removing the alcohol, the alcohol is carried into the aqueous solution, then a substantial stabilizing effect is obtained. The stabilizing liquid need not be present while the gum is subjected to degrading conditions. After the degradation of the gum has been brought about under degradation-inducing conditions, the conditions may be adjusted to those at which the commercial gum normally is stable and it has been pointed out above that if degradation has been initiated previously, it tends to continue even after the adjustment to the otherwise more stable conditions has been effected. However, if after having established such more stable conditions the gum is caused to be contacted with a stabilizing liquid in accordance with this invention, stability may be restored at least for a substantial interval of time which is sufficient to permit the solution to be filtered or otherwise treated prior to recovery of the gum in solid form. When the gum has been recovered in solid dry form, the viscosity-imparting characteristics of the gum remain stable at the predetermined desired value.

The recovery of gum from the dilute aqueous solution may be accomplished by drying as, for example, on the surface of a heated drum. The gum may also be coagulated by adding the gum solution to a volatile hydrophilic liquid, separating the coagulated gum, washing it with the hydrophilic liquid and drying. The volatile hydrophilic liquid that is used for coagulation may be any of the alcohols or other stabilizing liquids hereinabove described. After the gum has been reduced to solid form, and especially after drying, the gum is less subject to degradation due to hydrolysis. However, if the gum has been subjected to degradation prior to conversion to the solid form, a greater tendency to slowly degrade has been noted than in the case of commercial gum that has not been subjected to degradation. This is the case whether the gum is reduced to solid form by drying or by coagulation. When employing coagulation using one of the stabilizing liquids, its use as a coagulant has little or no effect in increasing the resistance of the dried recovered gum to gradual further degradation. However, if a stabilizing liquid is brought into contact with the gum while in dilute aqueous solution in an amount which is effective to afford stabilization but which is insufficient to effect coagulation, then upon recovery either by drying or by coagulation substantially greater resistance of the recovered dried product to gradual degradation has been noted. However, the major advantage in the practice of this invention is that it enables manno galactan gums to be subjected to hydrolytic degradation while in dilute aqueous solution in such manner that their viscosity-imparting characteristics can be better controlled and in that it makes it possible to discontinue or greatly retard further degradation, when a predetermined amount of degradation has occurred, for at least a sufficiently long time to permit processing such as filtering or other clarification without excessive or other uncontrolled degradation during the interval. The practice of this invention also makes it possible to counteract or completely eliminate troublesome and fortuitous influences of certain metals such as iron in inducing uncontrolled degradation.

The significance of this invention as regards the capacity of the stabilizing liquids to increase the resistance of a manno galactan gum to degradation that has been initiated is further described and illustrated in connection with the following examples.

*Example 1*

15 g. of commercial locust bean gum were dispersed in 1500 ml. of deionized water. The dispersion was heated to 80° C. in a reaction vessel under reflux, and on reaching 80° C. the dispersion was adjusted to pH 4 with hydrochloric acid. Heating at 80° C. was continued and samples of the dispersion taken at periodic intervals were cooled to 25° C. and tested for pH and viscosity using a No. 2 spindle at 6 r.p.m.

A second experiment was made similarly to the first experiment but with the addition to the dispersion of 100 mg. of iron in the form of electrolytic powder immediately following acidification of the latter.

A third experiment was made similarly to the first experiment, but in this case the locust bean gum was premixed with 25 ml. of 99% isopropanol. The premixed slurry of the locust bean gum and alcohol was allowed to stand at room temperature for 30 minutes before addition to the 1500 ml. of water.

A fourth experiment was made similarly to the third experiment, but with the addition of 100 mg. of iron in the form of electrolytic powder to the dispersion immediately following the acidification of the latter.

The extent of the degradation effected by acid hydrolysis at pH 4 in the presence and absence of iron and in the presence and absence of isopropanol is reflected by the viscosity data obtained from the foregoing experiments, as shown in Table I.

TABLE I.—EFFECT OF ISOPROPANOL ON THE ACID AND ACID-IRON-CATALYZED DEGRADATION OF LOCUST BEAN GUM

| Time at 80° C. (mins.) | Iron | | | | | | | |
|---|---|---|---|---|---|---|---|---|
| | None | | None | | 100 mg. | | 100 mg. | |
| | Isopropanol | | | | | | | |
| | None | | 25 ml. | | None | | 25 ml. | |
| | Viscosity | pH | Viscosity | pH | Viscosity | pH | Viscosity | pH |
| 0 | 3,025 | 3.88 | 3,050 | 3.97 | 2,810 | 4.01 | 3,150 | 3.90 |
| 15 | 2,350 | 3.91 | 2,880 | 3.98 | 1,440 | 4.11 | 2,810 | 3.99 |
| 30 | 1,975 | 3.91 | 2,710 | 3.99 | 1,140 | 4.28 | 2,400 | 4.08 |
| 45 | 1,775 | 3.92 | 2,525 | 3.98 | 820 | 4.35 | 2,100 | 4.13 |
| 60 | 1,625 | 3.92 | 2,275 | 3.99 | 600 | 4.39 | 1,890 | 4.22 |
| 90 | 1,175 | 3.93 | 2,160 | 3.99 | 300 | 4.55 | 1,660 | 4.43 |

As is evident from the foregoing table, the isopropanol when present exercised a stabilizing effect. The data also show that iron, when present, greatly accelerated degradation but that in the presence of the isopropanol there was less degradation even in the presence of iron than when both the iron and the isopropanol were absent.

*Example 2*

Experiments similar to those of Example 1 were repeated except that copper powder was substituted for the iron. When the copper was employed its effect in augmenting the rate of degradation was found to be even greater than that of iron.

*Example 3*

15 g. of commercial locust bean gum were dispersed in 1500 ml. of deionized water. The dispersion was heated to 80° C. under reflux and with stirring. On reaching 80° C. the dispersion was adjusted to pH 4 with hydrochloric acid. 100 mg. of electrolytic iron powder were added and heating at 80° C. was continued. Samples were taken at periodic intervals, cooled to 25° C. and tested for pH and viscosity using a No. 2 spindle at 6 r.p.m. The experiment was repeated several times with the addition of various amounts of 99% isopropanol following acidification and prior to introduction of the iron. The amounts of alcohol added and their effect upon viscosity at 25° C. are shown in Table II.

tinued and samles of the dispersion were taken at periodic intervals, cooled to 25° C. and tested for viscosity (No. 2 spindle at 6 r.p.m.) and pH but with replacement of the methanol by the other liquids specified in Table III which follows, 25 ml. of the organic liquid being used in each case.

TABLE III.—EFFECT OF VARIOUS ORGANIC COMPOUNDS ON THE ACID-IRON-CATALYZED DEGRADATION OF LOCUST BEAN GUM

| Compound | Time at 80° C. (minutes) | | | | | | | | | | | |
|---|---|---|---|---|---|---|---|---|---|---|---|---|
| | 0 | | 15 | | 30 | | 45 | | 60 | | 90 | |
| | Viscosity | pH | Viscosity | pH | Viscosity | pH | Viscosity | pH | Viscosity | pH | Viscosity | pH |
| Methanol | 3,060 | 3.60 | 1,915 | 3.70 | 1,650 | 3.72 | 1,290 | 3.79 | 1,135 | 3.87 | 790 | 4.11 |
| Ethanol | 3,210 | 4.03 | 2,550 | 4.19 | 2,400 | 4.30 | 2,110 | 4.42 | 1,885 | 4.59 | 1,675 | 4.92 |
| n-Propanol | 3,180 | 4.08 | 2,760 | 4.28 | 2,350 | 4.45 | 2,675 | 4.51 | 2,440 | 4.70 | 1,625 | 5.01 |
| n-Butanol | | | 2,690 | 4.21 | 2,760 | 4.33 | 2,665 | 4.39 | 2,270 | 4.48 | 2,185 | 4.65 |
| Isobutanol | 3,250 | | 2,325 | 3.70 | 1,375 | 3.89 | 1,190 | 3.93 | 965 | 3.99 | 570 | 4.11 |
| Sec.-butanol | 3,135 | 3.72 | 2,665 | 3.91 | 2,560 | 4.03 | 2,030 | 4.10 | 2,025 | 4.20 | 1,310 | 4.51 |
| Tert.-butanol | 3,040 | 4.01 | 2,425 | 4.20 | 2,100 | 4.31 | 1,660 | 4.50 | 1,500 | 4.61 | 1,145 | 4.85 |
| Ethylene glycol | 3,265 | 4.01 | 2,725 | 4.30 | 2,170 | 4.30 | 2,250 | 4.39 | 2,115 | 4.25 | 1,425 | 4.80 |
| Propylene glycol | 2,820 | 3.99 | 2,970 | 4.01 | 2,610 | 4.26 | 2,175 | 4.35 | 1,875 | 4.50 | 1,570 | 4.82 |
| Glycerol | 3,000 | 4.38 | 2,750 | 4.51 | 2,600 | 4.69 | 2,350 | 4.79 | 2,115 | 4.96 | 1,775 | 5.40 |
| Sorbitol | 3,520 | 4.20 | 2,830 | 4.34 | 2,155 | 4.75 | 1,525 | 4.75 | 1,575 | 4.71 | 1,400 | 4.90 |
| Acetone | 3,150 | 4.01 | 1,530 | 4.33 | 1,260 | 4.39 | 810 | 4.51 | 710 | 4.83 | 550 | 5.02 |
| Tetrahydrofuran | 3,090 | 4.00 | 3,075 | 4.30 | 3,025 | 4.50 | 2,715 | 4.61 | 2,700 | 4.72 | 2,375 | 5.20 |

As appears from the foregoing Table III, the alcohols listed as well as acetone all exercised a stabilizing effect on the degradation of locust bean gum under degradation conditions utilizing an acidic aqueous medium at elevated temperature in the presence of iron. However, from the standpoints of effectiveness, low toxicity and low cost, the preferred stabilizing liquid for use in the practice of this invention is isopropanol. In connection with the foregoing Table III, the pH varied somewhat and increased stability is contributed to by an increase in pH since the rate of acid hydrolysis is reduced by an increase in pH.

TABLE II.—EFFECT OF VARIOUS CONCENTRATIONS OF ISOPROPANOL IN THE ACID-IRON-CATALYZED DEGRADATION OF LOCUST BEAN GUM

| Time at 80° C. (mins.) | Isopropanol (ml.) | | | | | | | | | | | |
|---|---|---|---|---|---|---|---|---|---|---|---|---|
| | 0 | | 1 | | 5 | | 10 | | 50 | | 100 | |
| | Viscosity | pH | Viscosity | pH | Viscosity | pH | Viscosity | pH | Viscosity | pH | Viscosity | pH |
| 0 | 2,875 | 3.91 | 3,200 | 3.95 | 3,015 | 3.90 | 2,825 | 3.99 | 3,325 | 3.91 | 2,625 | 3.98 |
| 15 | 1,030 | 4.19 | 1,445 | 4.19 | 2,030 | 4.10 | 1,825 | 4.25 | 2,700 | 4.25 | 2,100 | 4.13 |
| 30 | 520 | 4.25 | 860 | 4.32 | 1,386 | 4.28 | 1,515 | 4.37 | 2,630 | 4.35 | 2,125 | 4.25 |
| 45 | 415 | 4.39 | 500 | 4.49 | 1,190 | 4.35 | 1,225 | 4.50 | 2,430 | 4.41 | 2,080 | 4.31 |
| 60 | 214 | 4.53 | 420 | 4.61 | 970 | 4.61 | 1,125 | 4.60 | 2,320 | 4.45 | 1,980 | 4.41 |
| 90 | 174 | 4.86 | 305 | 5.00 | 650 | 4.91 | 900 | 4.95 | 2,125 | 4.81 | 1,840 | 4.35 |

According to the data appearing in the foregoing table, the use of 50 ml. of 99% isopropanol proved to be the most effective for stabilizing the degradation of the gum at pH 4. Further improvements was not afforded upon increasing further the concentration of the isopropanol to 100 ml. The phenomenon of stabilization is therefore seen to be one which is exercised in dilute solution both as regards the gum and the amount of alcohol or other stabilizing liquid that is used with the gum.

*Example 4*

15 g. of commercial locust bean gum were wetted with 25 ml. of methanol and allowed to stand 30 minutes. The slurry of gum and alcohol was then dispersed in 1500 ml. of deionized water and heated to 80° C. under reflux. On reaching 80° C. the dispersion was adjusted to pH 4 with hydrochloric acid and 100 mg. of electrolytic iron powder also were added. Heating at 80° C. was con- In another experiment the pH was held constant for alcohols having different boiling points and loss of alcohol was permitted by evaporation. The alcohols of lower boiling point were found to have less effect, thus indicating that for maximum stabilizing effect the stabilizing liquid should be maintained in effective concentrations throughout the period of acid hydrolysis in order to maintain the stabilizing effect induced thereby throughout the acid hydrolysis.

*Example 5*

15 g. of commercial locust bean gum were dispersed in 1500 ml. of deionized water and after heating to 85° C. the dispersion was adjusted to pH 4 by means of hydrochloric acid and 100 mg. of electrolytic iron powder were added. The mixture was held at 85° C. with stirring for 90 minutes. The pH of the mixture was tested periodically and readjusted to pH 4 when necessary. At the end of the cooking period the gum solution was clarified by adding 30 g. of diatomaceous earth type filter aid and filtering under pressure. The gum in the clarified solution was coagulated by pouring the clarified filtrate into 2.5 volumes of 85% isopropanol per volume of gum solution. The coagulum was washed with 85% isopropanol and the alcohol was then removed by draining the coagulum and drying the coagulum at 60° C. for 2 hours. The recovered gum was ground to a 40-mesh powder.

A second experiment was made wherein 15 g. of commercial locust bean gum were subjected to dry heat at 60° C. for 2 hours before dispersing it in 1500 ml. of deionized water. Thereafter the dispersion was processed as in the first experiment.

A third experiment was made wherein 15 g. of commercial locust bean gum were premixed with 25 ml. of 99% isopropanol. After standing for 30 minutes the alcohol was removed from the gum by filtration and drying the gum at 60° C. for 2 hours. The dried gum was then dispersed in 1500 ml. of deionized water and the resulting dispersion was processed as in the first experiment.

A fourth experiment was made wherein 15 g. of commercial locust bean gum were premixed with 25 ml. of 99% isopropanol. The alcohol was then immediately filtered and the gum dried at 60° C. for 2 hours. The dried gum was then dispersed in 1500 ml. of deionized water and the resulting dispersion was processed as in the first experiment.

A fifth experiment was made wherein 15 g. of commercial locust bean gum were premixed with 25 ml. of 99% isopropanol. After standing 30 minutes, the gum-alcohol slurry was dispersed in 15 ml. of deionized water and the resulting dispersion was processed as in the first experiment.

A sixth experiment was made in the same manner as the fifth experiment except that the gum-alcohol slurry was dispersed in water and processed immediately.

A seventh experiment was made in the same manner as the first experiment except that a 2″ x 2″ square of sheet iron was used instead of electrolytic iron powder.

An eighth experiment was made in the same manner of the fifth experiment except that a 2″ x 2″ square of sheet iron was used instead of electrolytic iron powder.

1% solutions were prepared from portions of the recovered gums by dispersing the gum in cold deionized water, heating with stirring to effect complete solution of the gum, cooling the solutions to 25° C. and adjusting with deionized water to a concentration of exactly 1%. The viscosity (No. 2 spindle, 6 r.p.m.) and pH of the solutions were measured at 25° C. Other portions of the dried gums were tested for stability after aging them at 60° C. for three weeks, following which 1% solutions were again prepared and tested at 25° C. for viscosity (No. 2 spindle, 6 r.p.m.). The results of these tests are shown in Table IV which follows:

TABLE IV

| Experiment No. | Fe catalyst | Pretreatment of Locust Bean Gum | pH of Cook | Recovery* |
|---|---|---|---|---|
| 1 | Powder | None | 3.90–4.10 | 73.3 |
| 2 | do | Heated at 60° C | 3.50–3.95 | 71.3 |
| 3 | do | Isopropanol, 30 min., dried at 60° C | 3.85–4.20 | 72.7 |
| 4 | do | Isopropanol, immediately drained and dried. | 3.90–4.00 | 69.6 |
| 5 | do | Isopropanol, 30 min., not drained or dried. | 3.90–4.20 | 74.7 |
| 6 | do | Isopropanol, entire mixture immediately cooked. | 3.80–4.20 | 72.7 |
| 7 | Sheet | None | 3.85–4.10 | 71.3 |
| 8 | do | Isopropoanol, 30 min., not drained or dried. | 3.90–4.25 | 74.0 |

*Percent of commercial gum.

| Experiment No. | Viscosity | | | pH | |
|---|---|---|---|---|---|
| | Initial | 3 wks. at 60° C. | | Initial | 3 wks. at 60° C. |
| | | Viscosity | Percent loss | | |
| 1 | 175 | 106 | 39 | 6.21 | 6.11 |
| 2 | 212 | 127 | 40 | 6.12 | 6.29 |
| 3 | 180 | 105 | 42 | 6.29 | 6.18 |
| 4 | 263 | 148 | 44 | 6.39 | 6.10 |
| 5 | 818 | 477 | 42 | 6.38 | 6.21 |
| 6 | 679 | 417 | 38 | 6.75 | 6.90 |
| 7 | 535 | 335 | 37 | 6.32 | 6.28 |
| 8 | 1,060 | 788 | 26 | 6.48 | 6.58 |

It is significant in connection with the data shown in the foregoing table that the stabilizing liquid, namely, the isopropanol, must be present after the acid hydrolysis is initiated in order to exert a stabilizing action. When the gum was treated with the isopropanol and the alcohol was removed from the gum prior to establishing the conditions inducing acid hydrolysis the contact of the alcohol with the gum did not contribute significantly to the attainment of a stabilizing effect. The data in Table IV also indicate that the degrading influence of iron is in the nature of a catalysis dependent on surface area and that iron exerts a significant effect even when in massive metallic form.

The preceding examples illustrate the stabilizing effect of isopropanol and other stabilizing liquids under acid hydrolyzing conditions at elevated temperature which induce degradation. Normally it is desirable to stop the degradation at a point when predetermined desired viscosity characteristics have been attained. When conditions of acid hydrolysis are maintained so as to induce degradation the rate of degradation can be sharply decreased by adding alkali to increase the pH of the solution. Care has to be taken, however, in that if the pH is increased so as to be above 7 there is a tendency to darken the gum solution. Accordingly, if acid hydrolysis has been induced at a pH of 4 the rate of degradation can be sharply reduced by the addition of an alkali so as to adjust the pH to a pH of about 6.8. However, while the commercial locust bean gum when dispersed in water is substantially stable at a pH of 6.8, the effect of acid hydrolysis on the gum is such that after substantial acid hydrolysis of the gum has occurred additional degradation of the gum tends to continue even though the pH is adjusted to around 6.8, with erratic viscosity values and unpredictable products. However, if a stabilizing liquid is employed in accordance with this invention, the stabilizing effect is such that when the solution is returned to a pH of about 6.8 the gum is sufficiently stable so that its viscosity-imparting characteristics remain substantially constant at least for several hours. This manner of practicing the present invention is illustrated in the examples which follow.

*Example 6*

15 g. of commercial locust bean gum were dispersed in 1485 ml. of water and the dispersion was heated while being agitated to 75° C., which temperature was maintained constant. The viscosity values given in this example and Examples 7 to 11 which follow, unless otherwise stated were determined using a Brookfield LVF viscometer using a No. 2 spindle at 30 r.p.m. The solution was acidified to pH 4 which was maintained for 145 minutes, whereupon the solution was neutralized to pH 6.8. The viscosity values obtained are set forth in Table V.

TABLE V

| Time (mins.): | Viscosity (cps.) |
|---|---|
| 0 | 478 |
| 10 | 425 |
| (1.0 ml. 3 M hydrochloric acid added to pH 4.) | |
| 130 | 138 |
| 140 | 130 |
| 150 | 122 |
| 155 | 114 |
| (Neutralized to pH 6.8 with 1.1 ml. 3 M sodium hydroxide.) | |
| 185 | 112 |
| 215 | 108 |
| 245 | 103 |

It is to be noted from the foregoing table that in the absence of any stabilizing liquid being employed in accordance with this invention the solution of locust bean gum after having been neutralized to pH 6.8 was unstable and continued to degrade, as evidenced by the progressively lower viscosities after the neutralization step.

*Example 7*

15 g. of commercial locust bean gum were wetted with 24 ml. of 99% isopropanol and the mixture while covered was heated to about 83° C. whereupon the mixture was dispersed in 1465 ml. of water to make 1500 g. of a 1% dispersion which was heated to 75° C. while under agitation. Viscosity readings were started at 75° C., the solution being acidified to pH 4 followed by neutralization to pH 6.8, as appears from Table VI which follows:

TABLE VI

| Time (mins.): | Viscosity (cps.) |
|---|---|
| 0 | 425 |
| 10 | 431 |
| 20 | 438 |
| 30 | 474 |
| 40 | 475 |
| 50 | 510 |
| 60 | 467 |
| 70 | 463 |
| (1.0 ml. 3 M hydrochloric acid added to pH 4.) | |
| 145 | 167 |
| 150 | 162 |
| (Neutralized to pH 6.8 with 1.1 ml. 3 M sodium hydroxide.) | |
| 180 | 165 |
| 210 | 163 |
| 240 | 166 |
| 255 | 165 |
| 270 | 164 |
| 285 | 164 |
| 300 | 165 |
| 315 | 163 |
| 330 | 162 |
| 345 | 160 |
| 360 | 155 |

As shown from the foregoing table, the presence of isopropanol did not prevent degradation of the locust bean gum while at pH 4 and at 75° C. However, when the solution was brought back to pH 6.8, then the solution remained stable for 3 hours at 75° C. This is highly significant inasmuch as a 3-hour period is ample for filtration or other processing prior to recovery of the gum in solid form. This invention therefore makes possible controlled degradation of the locust bean gum to a desired point at which the gum is stabilized for a sufficient period of time to permit its recovery when possessing the viscosity-inducing properties that are desired.

*Example 8*

15 g. of commercial locust bean gum were wetted with 24 ml. of 99% isopropanol and dispersed in 1465 ml. of water to make 1500 g. of a 1% dispersion which was heated to 75° C. while subjected to agitation. Viscosity readings were taken at 75° C., which temperature was maintained throughout, any evaporation loss being replaced as needed. The viscosity readings under the different conditions of pH are set forth in the following table.

TABLE VII

| Time (mins.): | Viscosity (cps.) |
|---|---|
| 0 | 530 |
| 10 | 665 |
| 20 | 650 |
| 30 | 705 |
| 40 | 688 |
| 70 | 670 |
| (1.0 ml. 3 M hydrochloric acid added to pH 4) | |
| 100 | 433 |
| 115 | 372 |
| 130 | 323 |
| 145 | 285 |
| 160 | 256 |
| 175 | 221 |
| 185 | 200 |
| (Neutralized to pH 6.8 with 1.1 ml. 3 M sodium hydroxide, 24 ml. 99% isopropanol added) | |
| 255 | 212 |
| 275 | 210 |
| 290 | 208 |
| 305 | 205 |
| 320 | 210 |
| 335 | 207 |
| 350 | 210 |
| 365 | 202 |
| 380 | 210 |
| 395 | 205 |
| 405 | 197 |

As indicated in the foregoing table, part of the isopropanol was present in the solution as initially made up and a like amount of isopropanol was added when the acidified solution was neutralized to pH 6.8. This illustrates that a stabilizing liquid may be present during acid hydrolysis and that additional stabilizing liquid may be added after the acid hydrolysis for the purpose of prolonging the period at which the solution remains stable at pH 6.8. As shown in Table VII, in the presence of the additional isopropanol the solution remained stable at pH 6.8 and at a temperature of 75° C. for at least 3½ hours.

*Example 9*

15 g. of commercial locust bean gum were dispersed in 1485 ml. of water without addition of isopropanol or other stabilizing liquid. The mixture was heated to 75° C. under agitation and this temperature was maintained with evaporation loss replaced as needed. The viscosity readings were taken at 75° C. As shown in Table VIII below, the solution was acidified to pH 4 and then neutralized to pH 6.8. At pH 6.8 72 ml. of isopropanol were added.

TABLE VIII

| Time (mins.): | Viscosity (cps.) |
|---|---|
| 0 | 425 |

(1.0 ml. 3 M hydrochloric acid added to pH 4)

| | |
|---|---|
| 60 | 205 |
| 90 | 153 |
| 120 | 120 |

(Neutralized to pH 6.8 with 1.1 ml. 3 M sodium hydroxide, 72 ml. 99% isopropanol added; 3.8% of 1% LBG paste)

| | |
|---|---|
| 240 | 125 |
| 270 | 124 |
| 300 | 126 |
| 330 | 128 |
| 360 | 125 |
| 390 | 125 |
| 405 | 125 |
| 420 | 124 |
| 435 | 123 |
| 450 | 125 |

(Paste was placed in a 10° C. water bath for overnight, next day heated quickly back to 75° C.)

| | |
|---|---|
| 465 | 118 |
| 480 | 115 |
| 495 | 113 |
| 510 | 112 |

This example illustrates that the isopropanol or other stabilizing liquid need not be present during the period of hydrolytic degradation and is effective in accomplishing stabilization when added for the first time after the pH has been adjusted to 6.8. The quantity of isopropanol used in this example is three times that employed in Example 6 and it is to be noted that in the presence of the larger quantity of isopropanol the solution is maintained stable for at least 5½ hours at 75° C.

Example 10

15 g. of commercial locust bean gum were wetted with 24 ml. of 99% isopropanol and dispersed in 1465 ml. of water to make 1500 g. of a 1% dispersion which was heated to 75° C. while being subjected to agitation. The viscosity readings were taken at 75° C. and evaporation loss was replaced as needed. According to this example, the gum was recovered in solid form immediately after neutralization to a pH of 6.8. The viscosity readings up to this point are in Table IX below.

TABLE IX

| Time (mins.): | Viscosity (cps.) |
|---|---|
| 0 | 457 |
| 10 | 510 |
| 20 | 534 |
| 30 | 550 |
| 40 | 518 |
| 50 | 516 |
| 130 | 500 |

(1.0 ml. 3 M hydrochloric acid added to pH 4)

| | |
|---|---|
| 215 | 187 |
| 225 | 176 |
| 235 | 170 |
| 245 | 165 |
| 250 | 160 |

(Neutralized to pH 6.8 with 1.1 ml. 3 M sodium hydroxide, 24 ml. 99% isopropanol added)

The paste after neutralization, as appears in the foregoing table, was treated with 30 g. of a filter aid of the diatomaceous earth type and was subjected to filtration in a preheated pressure type filter over a period of about 45 minutes. The filtrate was coagulated in 2.5 volumes per volume of filtrate of 85% isopropanol to yield a white stringy coagulum which was washed with isopropanol, dried and ground to powdered form. The powdered gum was made up into a 1% aqueous solution by dissolving in hot water, followed by cooling to 25° C. The viscosity of the 1% solution at 25° C. was 1325 cps. when using a No. 2 spindle rotated at 12 r.p.m. This example illustrates the treatment of a commercial locust bean gum which, as supplied, provides a 1% solution having a viscosity at 25° C. of 3300 cps. when using a No. 3 spindle rotated at 12 r.p.m. for the production of a modified gum having the lower viscosity-imparting characteristics above noted. By the use of the isopropanol the gum is maintained stable during filtration and recovery in solid form and one thereby is enabled by following a stated procedure to produce a modified gum having predetermined desired viscosity-imparting characteristics. When the stabilizing liquid is not employed the degradation is of such uncontrolled and variable nature that it is impractical to attempt to modify a gum such as locust bean gum so as to have lowered viscosity-imparting characteristics within a predetermined desired range.

Example 11

This experiment illustrates the stabilizing effect of isopropanol during an iron press filtration and on the filtrate upon standing. 1020 g. of commercial locust bean gum were wetted with 1630 ml. of 99% isopropanol. The mixture was covered, heated to about 83° C. (181° F.) and dispersed while being subjected to agitation in about 27 gals. of cold water, followed by heating with indirect steam coils to 75° C. in 10 minutes. Viscosity readings were taken while maintaining said temperature and evaporation losses were replaced with hot water as needed. The viscosity readings are shown in Table X.

TABLE X

| Time (mins.): | Viscosity (cps.) |
|---|---|
| 0 | 465 |
| 10 | 590 |
| 20 | 660 |
| 30 | 730 |
| 40 | 615 |

(68 ml. 3 M hydrochloric acid added to pH 4)

| | |
|---|---|
| 70 | 365 |
| 90 | 270 |
| 100 | 245 |
| 110 | 235 |
| 120 | 195 |
| 125 | 180 |

(Neutralized to pH 7 with 75 ml. 3 M sodium hydroxide, 195 mins. 1630 ml. 99% isopropanol added)

About 2 gals. of the paste were removed for laboratory tests. The remainder was treated with 1870 g. of filter aid of the diatomaceous earth type and about 8 gals. of the paste were removed for laboratory stainless steel press filtration. The remaining 17 gals. were filtered through a 6-frame iron press using felt filter cloths. The press was rinsed with hot water follow-up to make 17 gals. of filtrate. About half the filtrate was coagulated in 2.5 volumes of 85% isopropanol per volume of paste. The remainder of the filtrate which then was at 55° C. was permitted to stand overnight at room temperature and then was coagulated in the manner stated above. The filtrate first half coagulum was drained, washed, dried and ground. The various portions were processed to finished powders, which were made up to 1% in water solution and tested for viscosity at 25° C. The results are shown in Table XI.

TABLE XI

| How processed: | Viscosity at 25° C. |
|---|---|
| Coagulated without filtration | 1140 |
| Held overnight, coagulated without filtration | 1110 |
| Bomb-filtered and coagulated | 1500 |
| Held overnight, bomb-filtered and coagulated | 1480 |
| Stainless steel-filtered and coagulated | 1480 |
| Stainless steel-filtered, held overnight and coagulated | 1510 |
| Iron press-filtered and coagulated | 1460 |
| Iron press-filtered, held overnight and coagulated | 1520 |

The lower viscosity values for the unfiltered samples results from the presence of filtrable material in the 1% solution, the average amount of apparent viscosity increase due to insolubles removed being about 32.4%.

The data in the foregoing table show that when treated with 1.3% of 99% isopropanol the neutralized paste remained stable for 19 hours when allowed to cool from 75° C. to room temperature. As regards the samples filtered through the stainless steel press and also filtered through the iron press, they remained stable for 19 hours when permitted to cool from 55° C. to room temperature. These experiments demonstrate that stabilization can be successfully accomplished according to this invention and that the degradation-inducing influence of an iron press filter can be completely overcome.

Example 12

15 g. of commercial guar gum were dispersed in 985 ml. of water to produce a 1.5% dispersion. The dispersion was heated to 65° C. while being subjected to agitation. Viscosity readings using a No. 4 spindle at 6 r.p.m. were made while maintaining the temperature at 65° C. Evaporation loss was replaced as needed. The viscosity readings are shown in Table XII which follows.

TABLE XII

| Time (mins.): | Viscosity (cps.) |
|---|---|
| 0 | 17,500 |
| 10 | 19,000 |
| 20 | 19,000 |
| 30 | 18,000 |
| 85 (1.5 ml. 3 M sulfuric acid added to pH 2) | |
| 95 | 13,000 |
| 105 | 8,500 |
| 115 | 8,500 |
| 125 | 7,500 |
| 135 | 6,000 |
| 145 | 5,000 |
| (Neutralized to pH 5 with 2.6 ml. 3 M sodium hydroxide) | |
| 160 | 4,000 |
| 260 | 3,000 |
| 290 | 2,000 |
| 320 | 1,500 |

It is apparent from the foregoing table that the viscosity of the solution at pH 5 and at 65° C. is unstable in the absence of a stabilizing liquid.

Example 13

The procedure of Example 12 was followed except that in this instance the guar was mixed with 12 ml. of 99% isopropanol before initial formation of the 1.5% solution. The viscosity readings (No. 4 spindle at 6 r.p.m.) are set forth in Table XIII which follows.

TABLE XIII

| Time (mins.): | Viscosity (cps.) |
|---|---|
| 0 | 15,000 |
| 10 | 20,000 |
| 20 | 21,500 |
| 30 | 22,000 |
| 40 | 25,000 |
| 50 | 22,000 |
| (1.5 ml. 3 M sulfuric acid added to pH 2) | |
| 70 | 16,500 |
| 85 | 14,000 |
| 100 | 11,000 |
| 110 | 8,500 |
| 120 | 6,000 |
| 130 | 6,000 |
| 145 | 5,000 |
| (Neutralized to pH 5 with 2.6 ml. 3 M sodium hydroxide) | |
| 155 | 5,000 |
| 185 | 5,000 |
| 215 | 5,000 |
| 245 | 4,500 |

The data appearing in the foregoing table show that in the presence of the isopropanol as a stabilizing liquid the 1.5% solution at pH 5 and at 65° C. remained stable for at least 2 hours.

A further experiment was generally similar to that of Example 13 except that the initial mixture of guar with isopropanol was heated to about 83° C. and except that the same quantity of alcohol which was used initially for wetting the gum also was added when the solution was neutralized to pH 5. In this case the solution at pH 5 and at 65° C. remained stable for at least 4½ hours.

Another experiment was carried out in a manner generally similar to that of Example 13 except that the mixture of gum with isopropanol as initially made up was heated to about 83° C. and except that when the solution was neutralized to pH 5 a quantity of isopropanol was added which was twice the quantity of isopropanol that was used in initially wetting the gum. Under these conditions the solution was such as to remain stable at pH 5 and at 65° C. for about 6 hours.

Example 14

22.5 g. of commercial grade guar gum was wetted with 18 ml. of 99% isopropanol. The resulting mixture was covered, heated to about 83° C. and dispersed in 1463 ml. of water to make 1500 g. of a 1.5% solution which was heated to 65° C. while being subjected to agitation. Viscosity readings were made while maintaining the temperature at 65° C., evaporation loss being replaced as needed. Viscosity readings (No. 4 spindle at 6 r.p.m.) are set forth in Table XIV below.

TABLE XIV

| Time (mins.): | Viscosity (cps.) |
|---|---|
| 0 | 16,700 |
| 10 | 17,500 |
| 20 | 17,400 |
| 30 | 18,500 |
| 40 | 18,000 |
| (2.25 ml. 3 M sulfuric acid added to pH 2.) | |
| 100 | 8,700 |
| 115 | 7,200 |
| 130 | 5,300 |
| 135 | 5,000 |
| (Neutralized to pH 5 with 4.0 ml. 3 M sodium hydroxide, 18 ml. 99% isopropanol added.) | |

215 (4.5 ml. 10% Cocate* added).
225 (roll dried on roll heated to about 165° C. in about 20 mins.).

*Cocate is a trade name for an anti-sticking preparation of the glyceryl monostearate type used to facilitate stripping the dried material from the drying roll.

The roll-dried product was ground through 2 #40 screen. A 1% aqueous dispersion of the powder was prepared and after mildly agitating for 1 hour the viscosity reading at 25° C. was 750 cps. using a No. 2 spindle at 12 r.p.m. This example demonstrates the successful stabilization of a 1.5% solution of guar gum at pH 5 and at 65° C. so as to permit recovery of the gum by roll drying after being subjected to acid hydrolysis whereby the viscosity of the gum in water solution is reduced by the degradation of the gum to a predetermined desired viscosity range.

When alkali is added to the gum solution following acid hydrolysis, it normally is preferable not to employ an amount of alkali which causes darkening of the product color. The pH at which darkening occurs is different for different gums. Thus in the case of locust bean gum some darkening of the product is caused if the pH adjustment goes above about pH 7. In the case of guar, some darkening is caused when the pH adjustment goes above about pH 5.

Examples 15 to 18 illustrate the irregularity of the degradation that occurs when attempt is made to clarify a gum solution by filtration at elevated temperature.

*Example 15*

A mixture of commercial locust bean gum and 80 parts by weight of water was heated to 87.8° C. with live steam in about 6¼ minutes in a wooden tank while undergoing agitation and then was held at this temperature. The viscosities of samples removed at intervals were determined at 71° C. and at 25° C. using a No. 2 spindle at 6 r.p.m. At the end of 112 minutes two parts of a diatomaceous earth type filter aid were added, followed by immediate filtration. Samples of the filtrate were collected in stainless steel pails and were coagulated in 2.5 volumes of 99% isopropanol after different periods of storage, the viscosity at 25° C. being determined immediately prior to coagulation. In each case the coagulated gum was dried and tested for viscosity at 25° C. in a 1% solution. In Table XV which follows the viscosities are shown of the samples which were removed at intervals prior to filtration, of the filtrate samples after the different periods of storage prior to coagulation, and of the 1% solutions of the coagulated product.

EXAMPLE XV

Effect on viscosity obtained in connection with Example 15 upon heating and filtering a solution of locust bean gum:

[Prior to filtration]

| Time, mins. | Temp., ° C. | Viscosity, cps. | |
|---|---|---|---|
| | | 71° C. | 25° C. |
| 0 | 87.8 | 1,750 | 6,080 |
| 16 | 87.8 | 1,050 | 3,940 |
| 25 | 87.8 | 950 | 3,690 |
| 35 | 87.8 | 930 | 3,420 |
| 55 | 87.8 | 750 | 2,940 |
| 70 | 87.8 | 650 | 2,685 |
| 85 | 87.8 | 600 | 2,485 |
| 100 | 87.8 | 530 | 2,160 |
| 110 | 87.8 | 480 | 2,130 |

[After filtration]

| Time period after Filtration | Filtrate prior to Coagulation Viscosity, cps. at 25° C. | 1% Solution of Coagulated Sample Viscosity, cps. at 25° C. |
|---|---|---|
| 0 | 835 | 1,274 |
| 1 hr | 840 | 1,035 |
| 2 hrs | 880 | 1,185 |
| 3 hrs | 825 | 1,000 |

*Example 16*

The procedure and quantities of Example 15 were employed, the heating to 87.8° C. being effected in 7 minutes and the samples being taken at the times given in Table XVI which follows.

TABLE XVI

Effect on viscosity obtained in connection with Example 16 upon heating and filtering a solution of locust bean gum:

[Prior to filtration]

| Time, mins. | Temp., ° C. | Viscosity, cps. | |
|---|---|---|---|
| | | 71° C. | 25° C. |
| 0 | 87.8 | | |
| 1 | 87.8 | 1,450 | 4,475 |
| 15 | 87.8 | 725 | 2,350 |
| 16 | 87.8 | 750 | 2,825 |
| 22 | 87.8 | 600 | 3,025 |

[After filtration]

| Time period after Filtration | Filtrate prior to Coagulation Viscosity, cps. at 25° C. | 1% Solution of Coagulated Sample Viscosity, cps. at 25° C. |
|---|---|---|
| 0 | 750 | 1,150 |
| 1½ hrs | 400 | 560 |
| 3 hrs | 275 | 385 |
| Overnight | 100 | |

*Example 17*

The procedure and quantities of Examples 15 and 16 were employed except that the solution was heated to 82° C. in 7.5 minutes and kept at this temperature, the samples being taken at the times given in Table XVII.

TABLE XVII

Effect on viscosity obtained in connection with Example 17 upon heating and filtering a solution of locust bean gum:

[Prior to filtration]

| Time, mins. | Temp., ° C. | Viscosity, cps. | |
|---|---|---|---|
| | | 71° C. | 25° C. |
| 0 | 82 | 1,425 | 4,075 |
| 15 | 82 | 1,300 | 3,950 |
| 27 | 82 | 1,150 | 3,875 |
| 42 | 82 | 1,025 | |
| 55 | 82 | 1,000 | |
| 61 | 82 | 1,000 | 3,300 |
| 80 | 82 | 850 | 3,175 |
| 90 | 82 | 750 | 1,875 |

[After filtration]

| Time period after filtration | 1% Solution of Coagulated Sample Viscosity, cps. at 25° C. |
|---|---|
| 0 | 2700 |
| Overnight | 2025 |

*Example 18*

Example 17 was repeated, the heat up to 82° C. requiring 7 minutes, and the samples being taken at the times given in Table XVIII.

TABLE XVIII

Effect on viscosity obtained in connection with Example 18 upon heating and filtering a solution of locust bean gum:

[Prior to filtration]

| Time, mins. | Temp., ° C. | Viscosity, cps. | |
|---|---|---|---|
| | | 71° C. | 25° C. |
| 0 | 82 | 1,475 | 4,900 |
| 15 | 82 | 1,200 | 3,825 |
| 25 | 82 | 1,050 | 4,200 |
| 40 | 82 | 825 | 3,350 |
| 50 | 82 | 950 | 3,250 |
| 53 | 82 | 950 | 3,400 |
| 70 | 82 | 750 | 3,300 |
| 80 | 82 | 725 | 2,400 |
| 90 | 82 | 725 | 3,075 |
| 100 | 82 | 725 | 3,175 |
| 110 | 82 | | |
| 112 | 82 | 700 | 2,200 |

[After filtration]

| Time period after Filtration | Filtrate prior to Coagulation Viscosity, cps. at 25° C. | 1% Solution of Coagulated Sample Viscosity, cps. at 25° C. |
|---|---|---|
| 0 | 1,850 | 2,950 |
| 1 hr | 1,850 | 2,500 |
| 2 hrs | 1,700 | 2,470 |

Since the locust bean gum in each of Examples 15 to 18 was from the same lot, it is apparent that the effects on viscosity which are incident to filtration of a gum solution at elevated temperature are unpredictable and are far too irregular to permit use of such procedures in a commercial operation. These difficulties have been overcome by the employment according to this invention of a water soluble polar organic oxygen-containing hydrophilic stabilizing liquid.

It is advantageous in the practice of this invention that effective stabilization can be effected when employing low percentages of stabilizing liquid. Usually at least about 0.95% of the stabilizing liquid is required in order to obtain reasonably effective stabilization. However, the quantity that is required in order to be effective depends on various factors including the inherent relative effectiveness of the liquid in question, temperature, pH and the presence or absence of a metal such as iron or copper which appears to have a catalytic effect in inducing degradation. Usually the desired stabilization can be obtained with an amount of about 2.9% or less. While additional stabilizing liquid may be present, it does not appear to further enhance the stabilization of the gum. However, in obtaining the stabilizing effect one should not use so much of the liquid as to cause substantial coagulation of the gum. When the gum product is to be recovered, then the gum solution may be added to a coagulant such as isopropanol for the purpose of coagulating the gum and permitting it to be recovered in solid form as by filtration. In usual practice one volume of gum solution is added to 2.5 volumes of ispropanol or other hydrophilic coagulant liquid.

Because of the inherent properties of manno galactan gums of producing very viscous aqueous solutions even when present in small quantities, the concentration of the gum solutions generally is of the order of those employed in the foregoing examples, namely, around 1% to 1.5%. Except for gums which already have become severely degraded, concentrations greater than about 2% become too pasty and viscous to be readily handled at a safe temperature, namely, a temperature that is not prejudicial to the properties desired in the recovered gum. As has been noted above, the stabilizing liquid is effective when at a high state of dilution and the stabilizing liquid should be contacted with the gum while the gum is in a dilute aqueous solution.

When controlled degradation is desired, it is preferable to effect such degradation at an elevated temperature after having lowered the pH by addition of an acid to the solution. Lowering of pH and elevation of temperature each tend to increase the rate of hydrolytic decomposition and they may be adjusted as desired in relation to each other. In a series of four experiments roughly analogous amounts of degradation were obtained in the case of locust bean gum acidified with HCl and held at a given elevated temperature and pH for 450 minutes, the conditions being as set forth below in Table XIX which follows:

TABLE XIX

| Experiment No. | pH | Temp. ° C. |
|---|---|---|
| 1 | 2 | 55 |
| 2 | 3 | 65 |
| 3 | 4 | 75 |
| 4 | 5 | 85 |

It is apparent from the foregoing that considerable latitude is permitted in the matter of pH, temperature and time for the acid hydrolysis. In addition to sulfuric and hylrochloric acids, other acidic materials may be used to obtain the desired acid pH such as citric, acetic or phosphoric. Similarly, when acid hydrolysis is employed and when the acidic solution is neutralized, neutralization by means of alkaline materials other than NaOH may be employed such as potassium hydroxide or calcium hydroxide. Lowering the temperature of the solution likewise results in adjustment to conditions less conducive to degradation.

What is claimed is:

1. In a process of treating a manno-galactan gum wherein said gum when initially dispersed at a concentration of approximately 1% to approximately 2% by weight in an aqueous solution thereof which is at room temperature and which is at a pH between about 4.5 and about 6.8 is substantially resistant to degradation but becomes substantially degraded responsive to increase in temperature and to lowering of pH of said solution and wherein said gum is subjected while dispersed in aqueous solution at said concentration to conditions of temperature and pH which cause substantial degradation of said gum, the step of including in said aqueous solution in contact with the degraded gum a water soluble polar organic oxygen-containing hydrophilic stabilizing liquid in an amount that imparts substantially greater resistance to degradation than if said liquid were not present and that is insufficient to cause substantial coagulation of the gum.

2. A method according to claim 1 wherein after said gum in said aqueous solution has become substantially degraded the conditions of temperature and pH are adjusted to conditions less conducive to degradation and wherein said water soluble polar organic oxygen-containing hydrophilic stabilizing liquid is present under said last-mentioned conditions and imparts greater resistance to degradation under said conditions than if said liquid were not present.

3. A method according to claim 2 wherein said solution is subjected to a clarification step for the removal of insoluble matter, which step is effected after said adjustment of said solution to conditions less conducive to degradation of said gum and while said water soluble polar organic oxygen-containing hydrophilic stabilizing liquid is present therein.

4. A method according to claim 2 wherein in producing the conditions of temperature and pH which substantially degrade said gum acid is added to lower the pH of said solution and wherein in producing said conditions less conducive to degradation of said gum an alkaline-reactive material is added to said solution to adjust the pH of said solution to a higher pH at which said gum is more stable.

5. A method according to claim 2 wherein the amount of said water soluble polar organic oxygen-containing hydrophilic liquid included in said solution is from about 0.95% to about 2.9% by weight thereof.

6. A method according to claim 2 wherein said water soluble polar organic oxygen-containing hydrophilic stabilizing liquid is selected from the group consisting of methanol, ethanol, N-propanol, isopropanol, N-butanol, isobutanol, secondary butanol, tertiary butanol, ethylene glycol, trimethylene glycol, propylene glycol, glycerol, sorbitol, acetone and tetrahydrofuran.

7. A process according to claim 2 wherein said stabilizing liquid comprises a water soluble lower aliphatic hydrophilic alcohol.

8. A process according to claim 7 wherein said stabilizing liquid comprises isopropanol.

9. A process according to claim 7 wherein said stabilizing liquid comprises butanol.

10. A process for treating a manno galactan gum selected from the group consisting of guar and locust bean gum which comprises subjecting said gum while contained in a dilute aqueous solution at a concentration of approximately 1% to approximately 2% by weight of said gum to conditions of pH and temperature which induce degradation, and increasing the resistance to degradation of said gum which has been subjected to said degradation-inducing conditions by contacting said gum while in said dilute solution at said concentration with a stabilizing liquid selected from the group consisting of methanol, ethanol, N-propanol, isopropanol, N-butanol, isobutanol, secondary butanol, tertiary butanol, ethylene glycol, trimethylene glycol, propylene glycol, glycerol, sorbitol, acetone and tetrahydrofuran, said stabilizing liquid being present in an amount that is at least about 0.95% by weight and that is insufficient to cause substantial coagulation of said gum in said solution.

References Cited

UNITED STATES PATENTS

| | | | |
|---|---|---|---|
| 2,380,115 | 7/1945 | Leo et al. | 260—209 |
| 2,803,558 | 8/1957 | Fronmuller | 260—209 |
| 3,146,200 | 8/1964 | Goldstein et al. | 260—209 |
| 3,240,775 | 3/1966 | Schweiger | 260—209 |
| 3,313,800 | 4/1967 | Jackson et al. | 260—209 |

FOREIGN PATENTS 834,375   5/1960   Great Britain.

LEWIS GOTTS, *Primary Examiner.*

E. ROBERTS, *Examiner.*

J. R. BROWN, *Assistant Examiner.*